United States Patent [19]

Meyer et al.

[11] Patent Number: 5,066,135

[45] Date of Patent: Nov. 19, 1991

[54] ROTATABLE VORTEXING TURNTABLE

[75] Inventors: Richard C. Meyer, La Habra; Duane G. Barber, Yorba Linda, both of Calif.

[73] Assignee: Beckman Instruments, Inc., Fullerton, Calif.

[21] Appl. No.: 230,208

[22] Filed: Aug. 9, 1988

[51] Int. Cl.[5] .......................... B01F 11/00; B06B 1/10; G01N 21/13

[52] U.S. Cl. .......................................... 366/208; 74/86; 366/218; 422/64

[58] Field of Search ............... 366/110, 111, 112, 208, 366/209, 217, 216, 219, 108, 213, 214, 218, 140, 142, 143; 422/63, 64, 65, 66, 67, 50, 68, 104, 99; 74/86, 63, 96, 98; 209/332, 366; 73/53, 863, 863.01, 863.91, 863.92, 864.81, 864.82, 864.91; 435/316

[56] References Cited

U.S. PATENT DOCUMENTS

| | | | |
|---|---|---|---|
| 2,127,706 | 8/1938 | Talbot | 366/214 |
| 2,255,799 | 9/1941 | Meinzer | 366/111 |
| 2,539,851 | 1/1951 | Massey | 74/86 X |
| 3,185,462 | 5/1965 | Shore | 366/216 |
| 3,310,292 | 3/1967 | Moore | 366/111 |
| 3,449,959 | 6/1969 | Grimshaw | 73/864.91 X |
| 3,467,500 | 9/1969 | Wilkinson et al. . | |
| 3,581,574 | 6/1971 | Smith | 74/86 X |
| 3,944,188 | 3/1976 | Parker et al. | 366/110 |
| 4,007,011 | 2/1977 | Greaves et al. | 422/50 |
| 4,030,834 | 6/1977 | Bauer et al. | 356/197 |
| 4,080,833 | 3/1978 | Huber | 73/423 |
| 4,172,339 | 10/1979 | Balz | 366/217 X |
| 4,173,418 | 11/1979 | Vork | 366/110 X |
| 4,276,258 | 6/1981 | Ginsberg et al. | 422/64 |
| 4,296,069 | 10/1981 | Smith et al. | 422/64 |
| 4,296,882 | 10/1981 | Kobayashi | 366/219 X |
| 4,305,668 | 12/1981 | Bilbrey | 366/111 |
| 4,325,910 | 4/1982 | Jordan | 422/64 |
| 4,406,547 | 9/1983 | Aihara | 356/414 |
| 4,427,294 | 1/1984 | Nardo | 356/344 |
| 4,447,395 | 5/1984 | Englar et al. | 422/68 |
| 4,459,265 | 7/1984 | Berglund | 422/64 |
| 4,479,720 | 10/1984 | Mochida et al. | 422/63 X |
| 4,501,164 | 2/1985 | Stockdale et al. | 73/864.25 |
| 4,543,238 | 9/1985 | Mimura et al. | 422/63 |
| 4,586,292 | 5/1986 | Carroll et al. | 366/219 X |
| 4,595,562 | 6/1986 | Liston et al. | 422/63 X |
| 4,629,703 | 12/1986 | Uffenheimer | 422/63 X |
| 4,647,432 | 3/1987 | Wakatake | 422/64 |
| 4,673,297 | 6/1987 | Siczek et al. | 366/208 |
| 4,678,752 | 7/1987 | Thorne et al. | 422/65 X |
| 4,700,117 | 10/1987 | Giebeler et al. | 318/327 |

FOREIGN PATENT DOCUMENTS

| | | | |
|---|---|---|---|
| 554336 | 1/1957 | Italy | 366/111 |

*Primary Examiner*—Harvey C. Hornsby
*Assistant Examiner*—Scott J. Haugland
*Attorney, Agent, or Firm*—William H. May; Gary T. Hampson

[57] ABSTRACT

A rotatable turntable for vortexing reactants comprises a vortexing plate which is rotatable. The motor drives for vortexing and rotation are stationary such that simple mechanical and electrical connection relative to the peripheral supports and to the vortexing plate can be achieved. A vortexing work station located in alignment with the turntable operates in synchronism with the turntable. Reactants at any radial reactant station on the vortexing plate can be withdrawn from and located onto the turntable at any radial location when the turntable stops rotation. The radial position of the turntable in relation to the outside vortexing and non-vortexing periphery remains relatively aligned.

39 Claims, 2 Drawing Sheets

ROTATABLE VORTEXING TURNTABLE

BACKGROUND

This invention relates to a rotatable vortexing turntable, particularly for the agitation and suspension of chemical reactants.

One of the problems that exists with current vortexing turntables is that the drive mechanisms which include electric motors for rotation and support mechanisms for the turntables are movable as the vortexing plate rotates and vortexes. This creates complex mechanical and electrical problems to ensure that wires feeding the electric motors do not become twisted about each other and that the plate aligns correctly relative to the outside non-rotating areas, such as work stations.

An additional problem of a motor which moves rotationally or in a vortexing motion is that a relatively high mass is movable. This causes undesirable vibrations of the turntable and the surrounding areas and the drive systems. The heavier mass to be moved also causes heavier duty motors to be needed to operate the system effectively.

A further problem is the alignment or registration of a vortexing turntable relative to a work station and other periphery of the turntable. Usually complex electronics is required to ensure that the circumferential location of the turntable is precisely positioned relative to a work station. This is to permit reactants to be moved onto and off the vortexing turntable.

It would be desirable to have a work station which can vortex in synchronism with the turntable so that reactants being agitated are uniformly subjected to vortexing, both when on the turntable and at the work station. In this manner, when testing is done on the reactants at the work station, the optimum desired conditions exist in that uniform vortexing can be achieved. Vortexing in this sense is the relatively strong agitation of the reactants which is necessary to keep particles in suspension. Should vortexing at the work station cease, then the incorrect chemistry results can be obtained.

It is also desirable to have a turntable which selectively can vortex so that reactants can rotate in their reaction capsules at high speed and selectively have the turntable rotate about its rotational axis. It is desirable to have a work station which can be selectively vortexed.

The prior art does not provide a turntable and work station with the above characteristics.

SUMMARY

By this invention there is provided a turntable and work station which meets these characteristics and provides for turntable vortexing and rotation with relatively low mass components, and for a work station selectively vortexing in synchronism with the turntable. Also provided are means to ensure that the turntable is located in a relative circumferential location which is unchanged relative to the adjacent circumferential non-rotating locations so that alignment is achieved between reactant stations on the turntable and the work station and other positions about the turntable.

According to the invention, a rotatable turntable for vortexing reactants comprises a vortexing plate on which a reactant is to be located for vortexing action. A first motive drive for moving the plate with the vortexing action and a second motive drive for causing the plate to rotate about a central axis of rotation include respective motive housings, at least the second motive housing being mounted to be stationary. Preferably both housings are mounted to be stationary. By this construction relative low mass motive means are necessary since there is less mass to be moved.

The vortexing plate is circular, and a rotatable drive plate is mounted below the vortexing plate. Below the drive plate there is mounted a base plate, the base plate being stationary. The drive plate is subject to rotation about the central axis of rotation and is free of vortexing action, and the vortexing plate is subject to vortexing and rotational movement.

The turntable drive plate includes preferably three pulley supports for carrying the vortexing plate. In some applications there may be more or less than three supports. The first motive means is centrally mounted on the central axis of rotation to and below the base plate with a drive shaft extending upwardly through an aperture in the base plate and an aperture in the turntable drive plate. A pulley on the drive shaft engages through a pulley belt a drive pulley on at least one of three pulley support bearings spaced about the turntable drive plate such that rotation of the drive shaft of the first motive means causes three pulleys to each rotate on eccentrically mounted bearings which imparts a vortexing action to the vortexing plate carried by the support. In an alternate mode the hub of the pulleys are eccentric and the shafts are concentric.

The ratio of the diameter of the pulley of the drive shaft of the first vortexing motive drive to the diameter of the drive pulley is such that for a single rotation of the plate the pulleys turn through a single rotation. In any circumferential location of the vortexing plate when the vortexing motive drive is stationary in a constant reference position the axis position of the vortexing plate relative to the circumferential periphery about the plate is unchanged, and the vortexing plate remains in register or alignment with the outer periphery.

A work station is mounted radially adjacent the vortexing plate, and can selectively vortex as required in the operational protocol in synchronism with the vortexing plate so that reactants remain in suspension while at the work station. During this time the vortexing plate can continue rotation and vortexing. The result of this is also to avoid unnecessary downtime in the operation of the turntable.

DRAWINGS

DESCRIPTION

Figure 1:
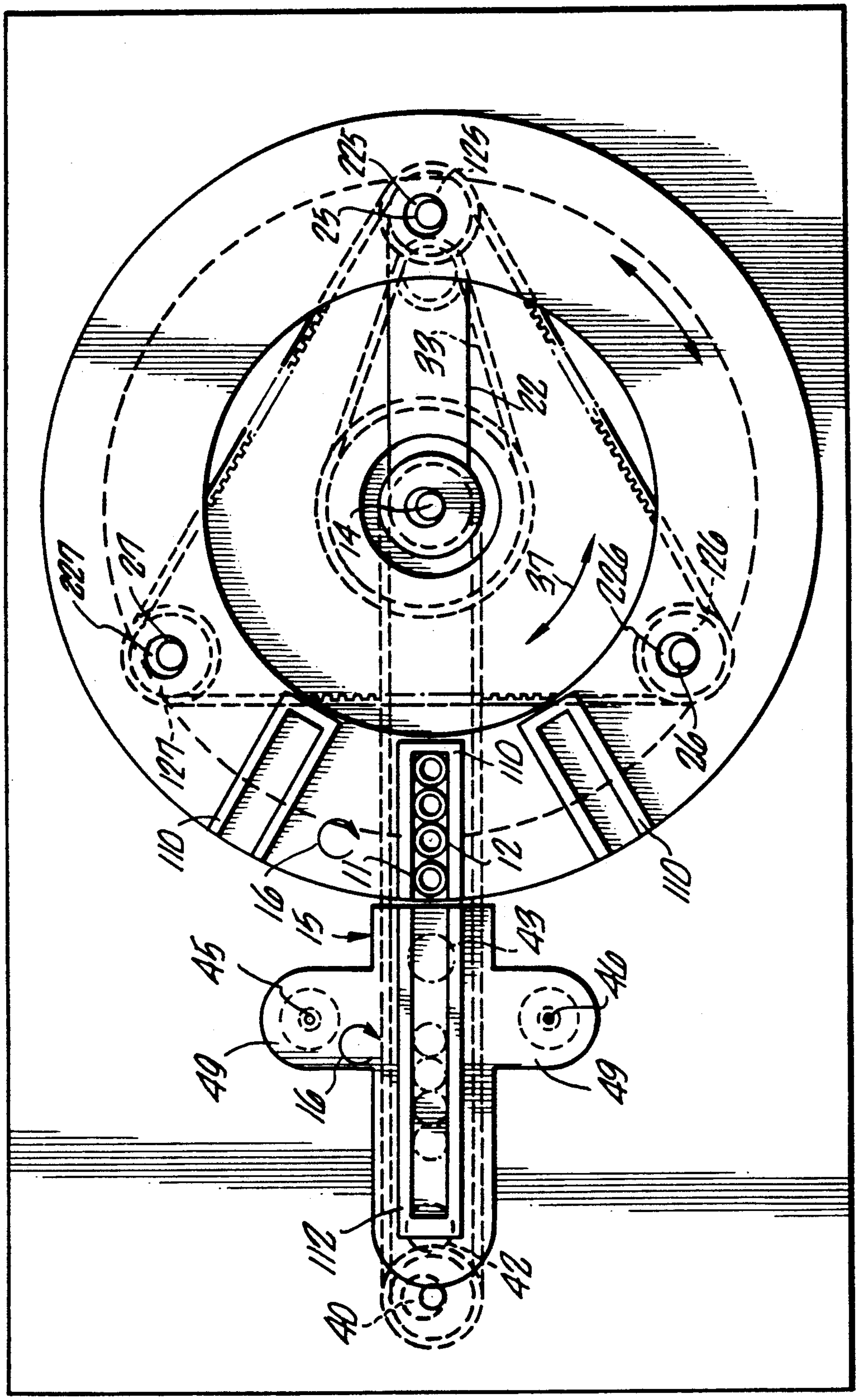
FIG. 1 is a plan view of a turntable and work station in accordance with the invention.
Figure 2:
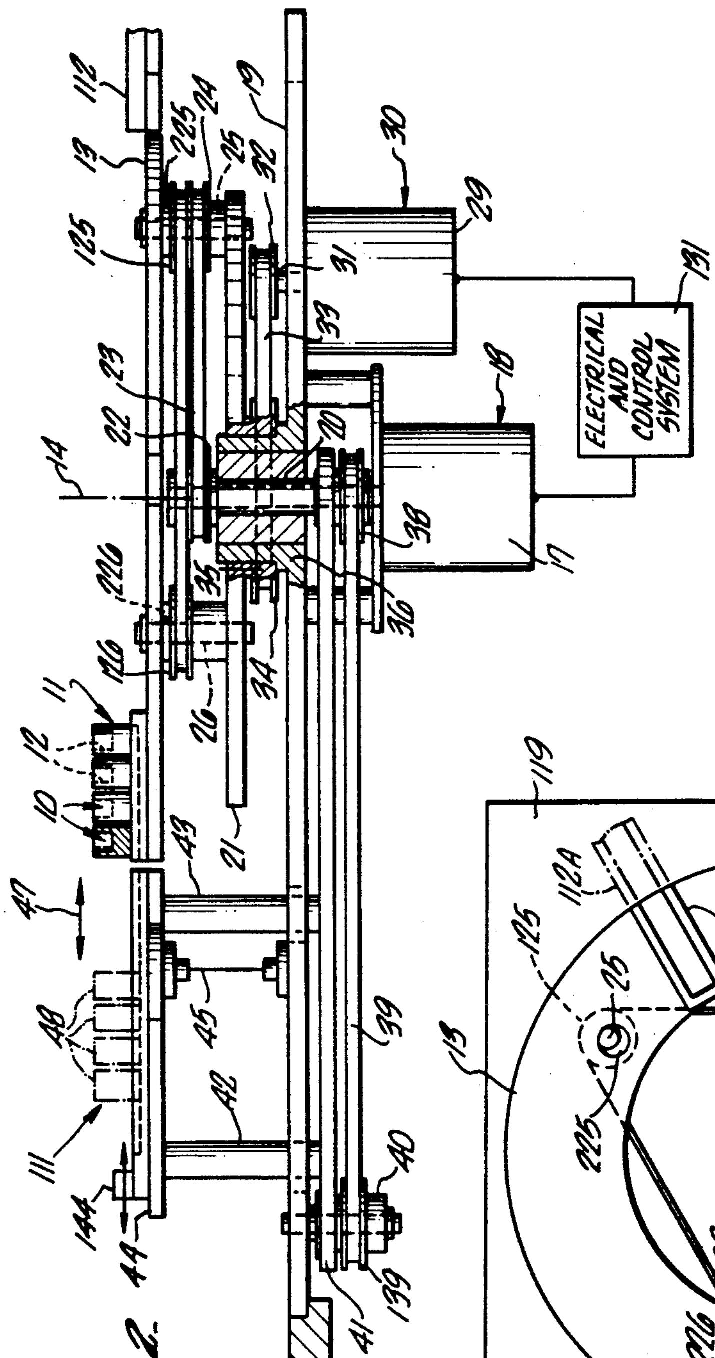
FIG. 2 is a partial sectional side view of a work station and turntable of FIG. 1.

A rotatable turntable for vortexing reactants 10 inside reaction capsules 11 contained in reaction wells 12 comprises a vortexing circular plate 13 rotational about a central axis 14. The reaction capsules 11, as illustrated, are in banks of four and are radially arranged on the vortexing plate 13 at reactant stations 110 which are discrete working positions circumferentially about the plate 13. The capsules 11 are arranged on the vortexing plate 13 to be radially moved off and onto the plate 13 at a location opposite the work station 15. The reactants 10 can be vortexed or agitated as indicated by arrows 16, while on the vortexing plate 13 and also at the work station 15.

A first motive drive 17 for moving the plate 13 with the vortexing action is mounted below the vortexing plate 13, with a housing construction generally indicated by numeral 18 mounted to and below a base plate 19. A drive shaft 20 extends from the housing 18 about the base plate 19 and also above a turntable drive plate 21 which is mounted between the base plate 19 and the vortexing plate 13. At the free end of the drive shaft 20, there is a pulley 22 which is connected with a toothed timing pulley belt 23 to a remotely located drive pulley 24 which is mounted at the circumferential extremity of the drive plate 21.

The drive pulley 24 is mounted on one of three pulley supports 25, 26 and 27 which are spaced about the central axis 14 through which the drive shaft 20 extends. The pulley supports 25, 26 and 27 are radially spaced from axis 14. Pulleys 125 126 and 127 are carried on the supports 25 26 and 27 respectively in eccentric relationship so that as the drive shaft 20 rotates, pulley 22 and drive pulley 24 in turn rotate as driven by the belt 23. This in turn drives pulley 125 through eccentric bearings mounted on the pulley supports 25, 26 and 27 rotating with the shaft: Pulley 125 is connected through toothed drive belt 28 with pulleys 126 and 127 so that the three pulleys 125, 126 and 127 move in synchronism causing the vortex plate 13 to agitate or vortex in the small circles as indicated by arrows 16. The approximate speed of rotation is about 1200 rpm and this should be regarded as strong or violent agitation as required to keep the reactants 10 in capsules 11 in suspension.

Mounted below the base plate 19 is a second motive drive 29 located in a housing generally indicated by numeral 30 which is mounted below and onto the drive plate 21 with a drive shaft 31 extending above the drive plate 21. Drive shaft 31 is connected with a pulley 32 which drives a toothed belt 33 and in turn, a pulley 34 which is attached to drive plate 21 through a central hub structure 35 to rotate on and, about housing 36 which surrounds the drive shaft 20. When the second motive means 29 operates to rotate the shaft 31, the pulley belt 33 turns pulley 34 which in turn causes the turntable drive plate 21 to rotate about the central axis of rotation 14. In this manner the three pulleys 125, 126 and 127 are rotatable about the central axis 14 as the turntable drive plate 21 rotates as indicated by arrow 37.

With this structure, the first drive housing 18 and the second drive housing 30 are stationary, both being mounted to the base plate 19. By having this structure and arrangement the electrical and control system illustrated diagrammatically as 131 to operate the motors which constitute the first motive drive 17 and second motive drive 29 can be housed in a stationary manner. The motors 17 and 29 are mounted with the facility to prevent any twisting of the electrical wires connecting the motors 17 and 29 with the electronic control system 131. This provides for a simple drive system of low mass, and hence the motive drives 17 and 29 need be of relatively lower power. In some cases only one of the motive housings, namely the rotating motive housing 30, is stationary. While this is not preferred, the mass is still reduced relative to two moving motive means.

In operation the turntable drive plate 21 can be selectively rotated by the second motive drive 29 and thereby rotate the vortexing plate 13 so that the work reactant stations 110 located on the vortexing plate 13 line up sequentially and in registration with the work station 15 as required. Simultaneously or selectively, the vortexing drive motor 17 can cause the vortexing action as indicated by arrow 16 of the vortexing plate 13 during the rotation of the vortexing plate 13 or when the vortexing plate 13 is stationary.

The pulley ratio between the pulley 22, namely the drive shaft vortexing pulley, and the drive pulley 24 is 1:1. When the vortexing motor drive shaft 20 is stationary, and the second motive means 29 is operational, a single rotation of the turntable drive plate 21 causes the drive pulley 24 and the eccentric pulleys, 125, 126, and 127 to turn through a single rotation. Eccentric bearings 225, 226 and 227 are mounted into the base of the plate 13 to interreact with respective pulleys 125, 126 and 127. Alternatively, supports 25, 26 and 27 provide an eccentric surface to engage the bearings remounted on the eccentric hub ends of shafts 25, 26 and 27. In such a case, the pulleys 125, 126 and 127 are mounted on the concentric portion of the shafts 25, 26 and 27. Shock absorbing elements are located in the space between the plate 13 and bearings 225, 226 and 227. With the various constrictions, eccentric vortexing motion is imparted to the plate 13.

When the vortexing motor 17 is stationary in a reference position and the rotating motor 29 is operational, this registration location between the vortexing plate 13 and outside vortexing or stationary components is unchanged. This mechanical configuration provides for an effective manner of ensuring that the capsules 11 of each radial reactant station 110 work position are aligned with the work station 15 and receiving stations 112A, 112B, and 112C without the necessity of complex electronic adjustment circuitry for locating and adjusting the circumferential position of the capsules 11 relative to the work station 15 or other outside components.

Figure 3:
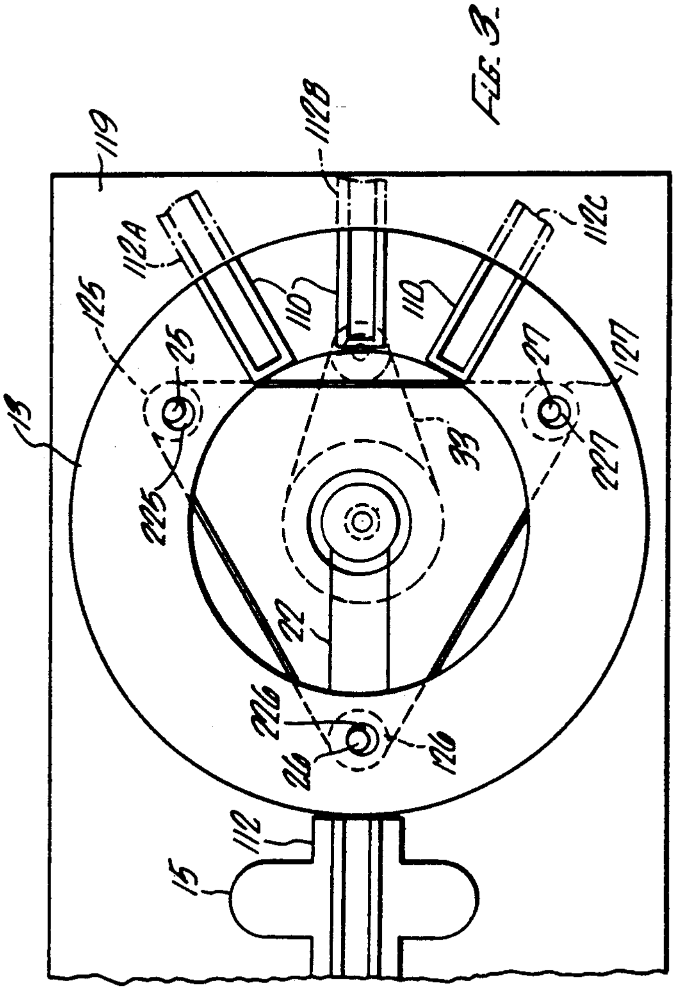
FIG. 3 is a diagrammatic plan view of the turntable relative to the work station in about 180° offset position of rotation relative to the depiction in FIG. 1.
Figure 4:
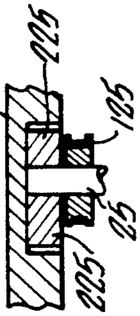
FIG. 4 is a diagrammatic partial sectional view illustrating the eccentric interrelationship of a plate pulley, bearing and vortexing plate.

In the diagrammatic illustration in FIG. 3, a different location of the pulleys 125, 126, 127 is illustrated at about 180° offset relative to FIG. 1. This shows the vortexing plate 13 maintaining the same relative position to outside peripherally circumferentially disposed components in different locations at different circumferential positions. As the work station 15 vortexes in synchronism, this maintains the work stations 110 in the same relative position to the outer peripheral circumferential position for different positions. Thus when the reactant stations 110 are in the position illustrated in FIG. 1, there will be alignment with receiving station 112 of the work station 15 as indicated. As different reactant stations 110 come into alignment with station 112, there will be alignment with the station 112. Similarly as indicated in FIG. 3, the different reactant stations 110 in the illustrative 180° circumferentially offset position are in the same position relative to the circumferential peripheral position around and adjacent any other work station about the vortexing plate 13. The relative location of any of the reactant stations 110 relative to the outside circumferential peripheral area or a plate 113 remains unchanged due to the 1:1 ratio between the vortexing motive shaft pulley 22 and drive pulley 24. Thus for different receiving stations 112A, 112B and 112C which could be located about the turntable, and whether or not they vortex in synchronism with the vortexing plate 13, there is the synchronous and registration lineup of reactant stations 110 and work station 112, 112A, 112B and 112C. This exists irrespective of the position at which the vortexing plate 13 stops on its rotational path.

The first motive drive means 17 is connected through the drive shaft 20 with a further pulley 38 and toothed pulley belt 39 to a pulley 139 mounted on an eccentric pulley bearing 40 which is mounted to and below a work station drive plate 41. Above the work station drive plate 41 are spaced pillars 42 and 43 which mount a working plate 44 so that it is vertically aligned with the vortexing plate 13. Spaced apart and to either side of a line between the pulleys 42 and 43 are a pair of flexible columns 45 and 46 which act to maintain planar motion of the working plate 44 of the work station 15. With this structure as the vortexing drive motor 17 rotates, the pulley 38 turns, and belt 39 drives the mounted pulley 139 and eccentric bearing 40 so as to cause the drive plate 41 to move in eccentric motion. This motion is in synchronism with the vortexing plate 13. Pillars 42 and 43 similarly move in vortexing motion as does the plate 44 as indicated by arrows 16. The reaction capsules 111 are illustrated in phantom on the working plate 44.

Capsules 11 in this manner can be loaded onto and removed from the vortexing plate 13 or plate 44 as indicated by arrow 47 since the work station 15 is kept in circumferential alignment with the vortexing plate 13. As the capsules 11 are drawn onto the work station 15, as indicated by position 48, vortexing of the reactants 10 can be maintained during processing at the work station 15.

With the construction therefore it is possible to have a situation where vortexing of reactants 10 on vortexing plate 13 and vortexing of reactants 10 on the working plate 44 occurs in synchronism and thus the reactants 10 undergo equivalent action while on the plate 13 and on the working plate 44 and remain in the same state of solution. This provides for more accurate chemical analysis and determinations at the work station 15. In some sequences the vortexing plate 13 can continue rotation while a particular capsule set 111 is at the work station 15. After an appropriate time, when the appropriate reaction station 110 on the vortexing plate 13 !s again aligned with the work station 15, then the capsules 111 can be loaded once again onto the vortexing plate 13 as indicated by numeral 11.

Various transfer mechanisms 144 can be used to load and withdraw the capsule sets 111 between the vortexing plate 13 and the working plate 44. At the work stations 15 all vortexing service functions such as drain, fill, wash and reagent additions can be performed. While vortexing, there is no relative vortex motion differences between the work station 15 and the vortexing plate 13 even though the turntable drive motor 29 is rotating. This advantage saves cycle time since the vortexing plate 13 can be rotated while vortexing to bring a particular reactant capsule 11 into the transfer off position from vortexing plate 13 for servicing at work station 15 as required.

The vortexing system advantage !s that the drive motors 17 and 29 and electronic components 131 remain stationary and therefore the minimum mass is vortexed. This allows for easier mechanical decoupling from the rest of the instrument and improved reliability of the system.

It should be appreciated that while a preferred embodiment of the invention has been described, many other examples are possible without departing from the scope of the invention. For instance, instead of three equidistantly related pulleys 125, 126 and 127 about the vortexing plate 13, there could be more pulleys and eccentric bearings arranged in the same fashion. Moreover, although only one work station 15 is shown, there can be several other work station spaced about the turntable to perform functions as required. Also instead of pulley 22 and drive pulley 24 being in a 1:1 relationship, the actual shaft 20 and support 25 are in a 1:1 ratio and the belt 23 engages teeth on the shaft 20 and support 25 to effect movement.

Many other examples of the invention exists, each differing from others in matters of detail only. The invention is not to be limited by the described embodiment but should be considered in terms of the spirit and scope of the following claims.

We claim:

1. A rotatable turntable comprising a vortexing plate on which reactants are to be located for vortexing action, a first motive drive including a shaft rotatable about a central axis for moving the plate with the vortexing action, a second motive drive including a drive shaft rotatable about an axis for causing the plate to rotate, both the first motive drive and the second motive drive include motive housings, and both the axes of rotation of the drive shafts and the motive housings being mounted to be non-rotational during operation of the first and the second motive drives, wherein the vortexing plate is circular, the turntable including a rotatable drive plate having a central axis of rotation cooperatively mounted below the vortexing plate, a base plate cooperatively mounted below the drive plate, and a mounting on the base plate for locating the drive plate relative to the base plate, the base plate being stationary, the drive plate being subject to rotation about the axis of rotation and being free of vortexing action, and the vortexing plate being subject to vortexing and rotational movement, wherein the vortexing plate includes radially located reactant stations about the plate, the reactants for vortexing being located at selected reactant stations, and wherein both the first and second motive housings are mounted below the drive plate.

2. A rotatable turntable as claimed in claim 1 wherein the second motive drive shaft is rotatable in the second motive housing and, selectively, is stationary or rotatable when the vortexing plate vortexes such that, on shaft rotation a rotating motion is imparted to the vortexing plate and, on being stationary no rotating action is imparted to the vortexing plate.

3. A turntable as claimed in claim 2 wherein the first motive drive shaft is rotatable in the first motive housing and, selectively, is rotatable when the vortexing plate is subject to rotating action such that the second motive drive selectively moves the reactants to different radial locations about the central axis of rotation of the vortexing plate.

4. A turntable as claimed in claim 1 wherein the first and second motive housings are mounted below the base plate.

5. A turntable as claimed in claim 4 wherein the second motive housing is mounted to and below the base plate, and off-center of the base plate, and including a pulley system, and wherein the second motive drive acts through the pulley system to rotate the drive plate.

6. A turntable as claimed in claim 5 wherein the drive plate includes pulley supports for carrying the vortexing plate, and pulleys mounted on the pulley supports, the pulleys being in eccentric relationship relative to vortexing plate.

7. A turntable as claimed in claim 6 wherein there are three pulley supports, the supports being spaced about the drive plate from each other and from the central axis of rotation of the drive plate.

8. The turntable as claimed in claim 7 wherein the first motive drive is mounted at the central axis of rotation of the drive plate, the mounting being to and below the base plate, the turntable including an aperture in the base plate and an aperture in the drive plate, the drive shaft of the first motive drive extending through the apertures, and a pulley on the first motive drive shaft, and including a pulley belt and wherein the drive shaft is connected through the pulley belt with at least one of the three pulley supports such that rotation of the drive shaft of the first motive drive is connected with the pulleys mounted on the pulley supports and thereby causes, through connection with the pulleys, each being connected with the vortexing plate, each pulley to turn in eccentric relationship with the vortexing plate and thereby to impart a vortexing action to the vortexing plate carried by the supports.

9. A turntable as claimed in claim 8 wherein the second motive drive is mounted below the base plate with its drive shaft extending through a second aperture in the base plate, the turntable including a belt, a centrally located pulley connected with the drive plate and a pulley at the end of the drive shaft of the second motive drive, the shaft being connected through the belt with the centrally located pulley for imparting rotational motion to the drive plate.

10. A turntable as claimed in claim 9 including a drive pulley means having a diameter for the vortexing plate and wherein the ratio of the diameter of an end of the drive shaft pulley on the drive shaft of the first motive drive to the diameter of the drive pulley means for the vortexing plate is 1:1 such that for a single rotation of the drive shaft, the pulleys on the pulley supports turn through a single rotation such that, for different circumferential locations of the vortexing plate, the radial positions of radially located reactant stations about the vortexing plate are aligned relative to circumferential peripheral positions about the plate when the drive shaft of the first motive drive is stationary.

11. A turntable as claimed in claim 1 including a work station mounted at a radial location beyond the vortexing plate, the work station having a working plate vertically aligned with the vortexing plate.

12. A turntable as claimed in claim 11 including a belt and a pulley and wherein the shaft of the first motive drive is connected with the pulley by the belt, the pulley being structurally connected to the working plate and below the working plate such that the working plate is adapted to move synchronously with the vortexing plate vortexing motion.

13. A turntable as claimed in claim 12 including a work station drive plate and wherein the work station is mounted on the work station drive plate below the base plate, the belt being connected between the first motive drive shaft and the pulley, the pulley being for the work station, a bearing, the pulley of the work station being mounted on the bearing below the work station drive plate, such that the work station drive plate moves with synchronous vortexing motion when the first motive drive shaft rotates.

14. A turntable as claimed in claim 13 wherein the work station includes means to draw reactants from the vortexing plate when the reactants are aligned with the work station and wherein the reactants are selectively subjected to vortexing through the vortexing motion imparted to the working plate.

15. A turntable as claimed in claim 14 wherein the base plate extends beyond the drive plate and below the working plate and the working late including the work stations, stabilizer pillars connected between the work station drive plate and the working plate mounted above the work station drive plate thereby to insure substantially planar movement of the work station plate and work station drive plate during vortexing action.

16. A rotatable turntable comprising a vortexing plate on which reactants are to be located for vortexing action, a first motive drive including a drive shaft rotatable about a central axis for moving the plate with the vortexing action, a second motive drive including a drive shaft rotatable about an axis for causing the plate to rotate about an axis of rotation and wherein both the first motive drive and the second motive drive include motive housings, the axes of rotation of the drive shafts and the housings being mounted to be non-rotational during operation of the first and second motive drives and a rotatable drive plate cooperatively mounted below the vortexing plate, the turntable including a base plate mounted cooperatively below the drive plate, the base plate being stationary, the drive plate being subject to rotation about the central axis of rotation and being free of vortexing action, and the vortexing plate being subject to vortexing and rotational movement, and at least the first motive drive being mounted below the drive plate.

17. A turntable as claimed in claim 16 including a work station mounted at a radial location beyond the vortexing plate, the work station having a working plate vertically aligned with the vortexing plate.

18. A turntable as claimed in claim 17, including pulleys related and connected to the vortexing plate, radially located reactant stations about a periphery of the vortexing plate, and wherein a single rotation of the drive shaft of the first motive drive causes the pulleys to turn the through a single rotation such that, for different circumferential locations of the vortexing plate, the radially located reactant stations peripherally about the vortexing plate are aligned relative to circumferential peripheral positions about the plate when the drive shaft of the first motive drive is stationary.

19. A rotatable turntable as claimed in claim 1 wherein both the motive housings are stationarily mounted below the base plate and the drive plate.

20. A rotatable turntable as claimed in claim 19 wherein the drive shaft of the second motive drive is rotatable in the second motive housing and, selectively, is stationary or rotatable when the vortexing plate vortexes such that, on shaft rotation a rotating motion is imparted to the vortexing plate and, on being stationary, no rotating action is imparted to the vortexing plate.

21. A turntable as claimed in claim 20 wherein the drive shaft of the first motive drive is rotatable in the first motive housing and, selectively, is rotatable when the vortexing plate is subject to rotating action such that the second motive drive selectively moves the reactants to different radial locations about the axis of rotation of the vortexing plate.

22. A turntable as claimed in claim 19 wherein the vortexing plate is circular and wherein below the vortexing plate there is mounted the rotatable drive plate, and below the rotatable drive plate is mounted the base plate, the turntable including a mounting on the base plate for locating the drive plate relative to the base plate, the base plate being stationary, the drive plate being subject to rotation about the axis of rotation and being free of vortexing action, and the vortexing plate being subject to vortexing and rotational movement.

23. A turntable as claimed in claim 22 wherein the vortexing plate includes radially located reactant stations about the vortexing plate, the reactants for vortexing being located at selected reactant stations.

24. A turntable as claimed in claim 22 including a work station mounted at a radial location beyond the vortexing plate, the work station having a working plate vertically aligned with the vortexing plate.

25. A turntable as claimed in claim 24 including a belt and a pulley and wherein the belt connects the shaft of the first motive drive with the pulley, the pulley being structurally connected to the working plate and mounted below the working plate such that the working plate is adapted to move synchronously with the vortexing plate vortexing motion.

26. A turntable as claimed in claim 15 including a work station drive plate and wherein the work station is mounted on the work station drive plate below the base plate, and the belt connection between the first motive drive shaft and the pulley structurally connected to the working plate is located below the work station drive plate, the turntable including, the pulley being for being mounted on the bearing below the work station drive plate, such that the work station drive plate moves with synchronous vortexing motion when the second motive drive shaft rotates.

27. A turntable as claimed in claim 26 wherein the work station includes means to draw reactants from the vortexing plate when the vortexing plate is stationary and the reactants are aligned with the work station and wherein the reactants are selectively subjected to vortexing through the vortexing motion imparted to the working plate.

28. A turntable as claimed in claim 27 wherein the base plate extends beyond the drive plate and below the working plate and including stabilizer pillars between the work station drive plate and the working plate mounted above the work station drive plate thereby to insure substantially planar movement of the work station plate during vortexing action.

29. A turntable as claimed in claim 19 wherein the second motive housing is mounted to and below the base plate, and off-center of the base plate, the turntable further comprising a pulley system, the second motive drive acting through the pulley system thereby to rotate the drive plate.

30. A turntable as claimed in claim 29 wherein the drive plate includes pulley supports for carrying the vortexing plate, and pulleys on the pulley supports, the pulleys being mounted in eccentric relationship relative to vortexing plate.

31. A turntable as claimed in claim 30 wherein there are three pulley supports, the supports being spaced about the drive plate from each other and from the central axis of rotation of the drive plate.

32. A turntable as claimed in claim 31 wherein the first motive drive is mounted at the central axis of rotation of the drive plate, the mounting being to and below the base plate, the turntable including an aperture in the base plate and an aperture in the drive plate, the drive shaft of the first motive drive extending through the apertures, and the turntable further comprising a pulley on the drive shaft of the first motive drive and including a pulley belt, the pulley being connected through the pulley belt to at least one of the three pulley supports, the pulley being operatively related to and connected to the vortexing plate such that rotation of the drive shaft of the first motive drive causes the pulleys on the pulley supports each to turn in eccentric relationship relative to the vortexing plate to impart a vortexing action to the vortexing plate carried by the supports.

33. A turntable as claimed in claim 32 wherein the second motive drive is mounted below the base plate with its drive shaft extending through a second aperture in the base plate, the turntable including a belt, a centrally located pulley connected with the drive plate and a pulley at the end of the second motive drive shaft, the second motive drive shaft being connected through the belt with the centrally located pulley for imparting rotational motion to the drive plate.

34. A turntable as claimed in 33 wherein the pulley system includes drive pulley means for the drive plate having a diameter, the ratio of the diameter of the drive shaft pulley on the drive shaft of the first motive drive to the diameter of the drive pulley means for the drive plate is 1:1 such that for a single rotation of the first motive drive shaft, the pulleys on the pulley supports turn through a single rotation such that, for different circumferential locations of the vortexing plate, the radial positions of radially located reactant stations about the vortexing plate are aligned relative to circumferential peripheral positions about the plate when the drive shaft of the first motive drive is stationary.

35. A rotatable turntable comprising a vortexing plate on which reactants are to be located for vortexing action, a first motive drive including a drive shaft rotatable about a central axis for moving the plate with the vortexing action, a second motive drive including a drive shaft rotatable about an axis for causing the plate to rotate about an axis of rotation and wherein both the first motive drive and the second motive drive include motive housings, the axes of rotation of the drive shafts of the motive drives and the motive housings being mounted to be non-rotational during operation of the motive drives and a rotatable drive plate cooperatively mounted below the vortexing plate, the turntable including a base plate cooperatively mounted below the drive plate, a mounting on the base plate for locating the drive plate relative to the base plate, the base plate being stationary, the drive plate being subject to rotation about the central axis of rotation and being free of vortexing action, and the vortexing plate being subject to vortexing and rotational movement, and the first and second motive drives being mounted below the drive plate.

36. A turntable as claimed in claim 35 including a work station mounted at a radial location beyond the vortexing plate, the work station having a working plate vertically aligned with the vortexing plate.

37. A turntable as claimed in claim 35 including pulleys operatively related to and connected to the vortexing plate, radially located reactant stations about a periphery of the vortexing plate, and wherein a single rotation of the drive shaft of the first motive drive causes the pulleys to turn through a single rotation such that, for different circumferential locations of the vortexing plate, the said radially located reactant stations are peripherally located about the vortexing plate and are aligned relative to circumferential peripheral positions about the plate when the drive shaft of the second motive drive is stationary.

38. A turntable as claimed in claim 1 wherein the second motive drive selectively rotates the vortexing plate about the central axis of rotation of the drive plate, and the turntable including a work station located outside the circumference of the plate and including means for selectively moving reactants between the plate and the work station located outside the circumference of the plate, and means for selectively vortexing the work station.

39. Apparatus of claim 38 wherein the first and second motive drives include means for eccentrically moving radially located reactant stations on the vortexing plate to be relatively synchronous and in register with different circumferential locations about the vortexing plate wherever the vortexing plate is circumferentially located, radially located reactant stations being located peripherally about the vortexing plate, such that the work station is located in correct alignment with said radially located reactant stations to permit movement of reactants between the vortexing plate and work station.

* * * * *

UNITED STATES PATENT AND TRADEMARK OFFICE
CERTIFICATE OF CORRECTION

PATENT NO. : 5,066,135

DATED : November 19, 1991

INVENTOR(S) : Meyer, Richard C., et al.

It is certified that error appears in the above-identified patent and that said Letters Patent is hereby corrected as shown below:

Claim 18, Col. 8, line 43 reads "locations of the vortexing plate, the radially..." should read --locations of the radially--.

Claim 26, Col. 9, lines 28 and 29 reads "including, the pulley being for being mounted on the bearing below" should read --including a bearing, the pulley being mounted on the bearing below--.

Signed and Sealed this

Twenty-sixth Day of April, 1994

Attest:

Bruce Lehman

BRUCE LEHMAN

Attesting Officer

Commissioner of Patents and Trademarks